May 17, 1955
W. TODD
2,708,583
TOOL HOLDER FOR A TURRET LATHE
Filed July 8, 1954
2 Sheets-Sheet 1
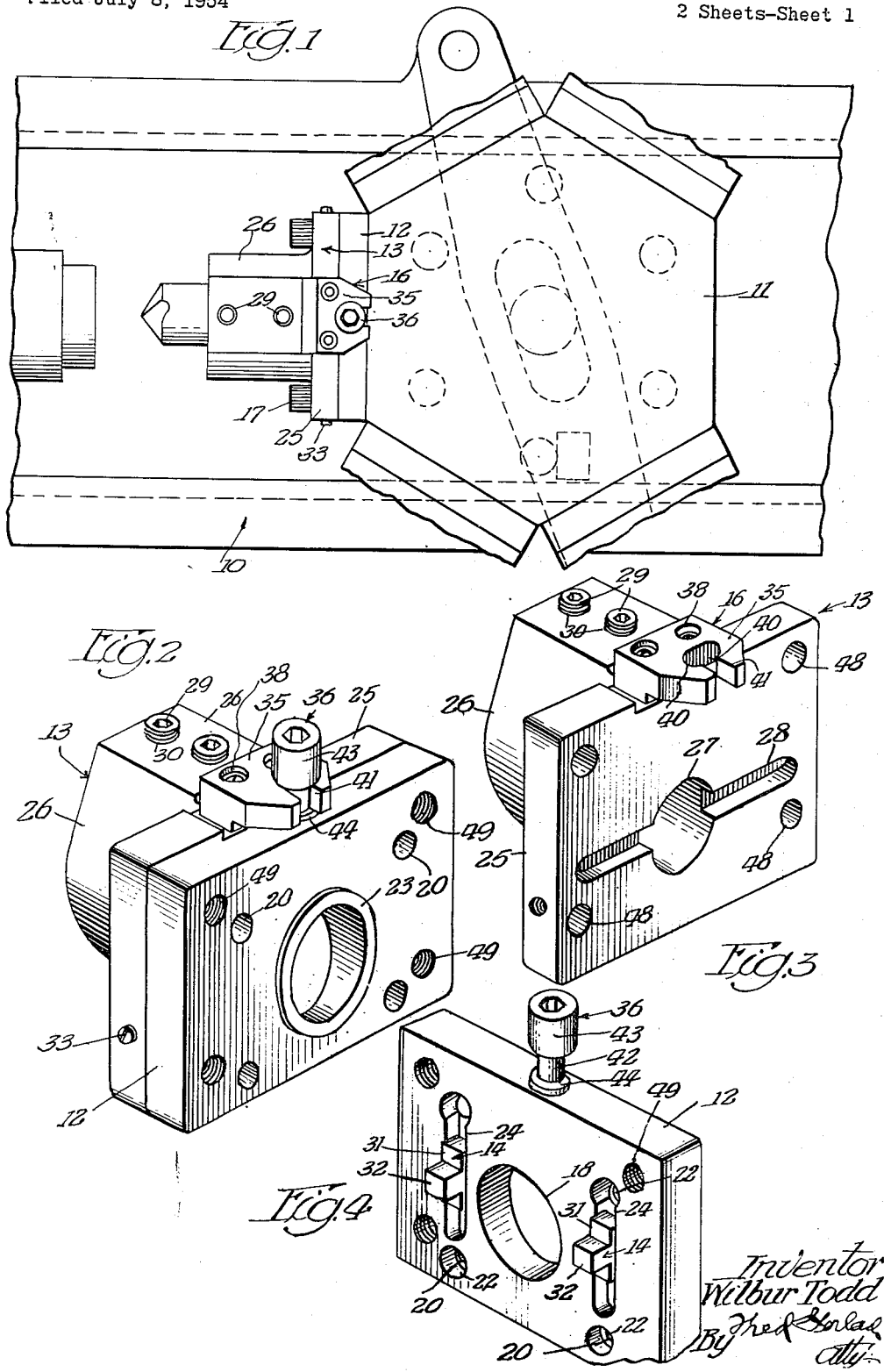

May 17, 1955
W. TODD
2,708,583
TOOL HOLDER FOR A TURRET LATHE
Filed July 8, 1954
2 Sheets-Sheet 2
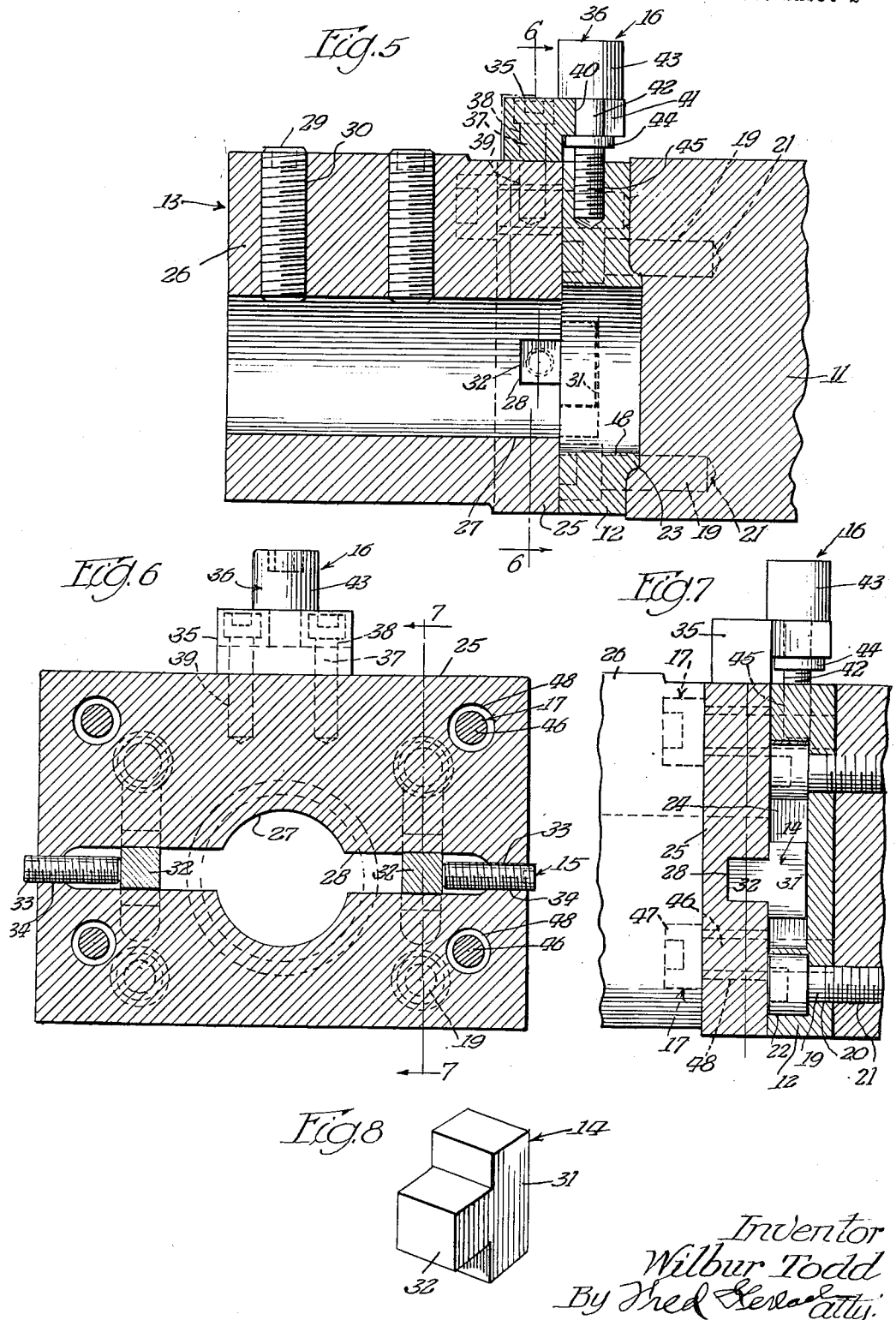

United States Patent Office 2,708,583
Patented May 17, 1955

2,708,583
TOOL HOLDER FOR A TURRET LATHE

Wilbur Todd, Chicago, Ill.

Application July 8, 1954, Serial No. 442,011

7 Claims. (Cl. 279—6)

The present invention relates generally to tool holders. More particularly, the invention relates to that type of holder which is adapted for use in connection with a turret lathe, serves as a supporting medium or instrumentality for a drill, center, boring bar or other shank variety tool, and as its principal parts or components comprises: (1) a plate-like attaching part which is adapted to fit against one of the side faces of the turret of the lathe and has transversely extending bolts for fixedly securing it in place; and (2) a one-piece holder member which consists of a plate-like rear part in abutting relation with the attaching part and a tubular set-screw-equipped front element for receiving and holding the tool.

One object of the invention is to provide a tool holder of the aforementioned type which is an improvement upon, and has certain inherent advantages over, previously designed holders and is characterized by the fact that it embodies simple and novel means whereby the holder member may be adjusted horizontally to a limited extent relatively to the plate-like attaching part and simple and novel means whereby the holder member may be adjusted vertically to a limited extent relatively to the attaching part.

Another object of the invention is to provide a tool holder of the type under consideration in which the holder member is guided for truly rectilinear horizontal and vertical adjustment by way of two laterally spaced T-shaped keys, the cross pieces of which are mounted for vertical sliding movement in two spaced apart vertical grooves in the front portion of the plate-like attaching part and the shank pieces of which are mounted for horizontal sliding movement in a pair of aligned but spaced apart horizontal grooves in the rear portion of the plate-like rear part of the holder member.

Another object of the invention is to provide a tool holder of the type and character under consideration in which the means for horizontally adjusting the holder member to a limited extent relatively to the plate-like attaching part consists of a pair of coaxial horizontal screws which extend through screw-threaded horizontal holes in the side portions of the rear part of the holder member, have the inner ends thereof in abutting relation with the shank pieces of the T-shaped keys and are adapted when one is loosened and the other tightened to adjust the holder member horizontally in one direction and when the other is loosened and the one is tightened to adjust the holder member horizontally in the opposite direction.

Another object of the invention is to provide a tool holder of the aforementioned character in which the means for adjusting the holder member vertically to a limited extent relatively to the plate-like attaching part consists of two coacting elements, namely, a horizontal bracket, the front portion of which is bolted to the central portion of the top surface of the plate-like rear part of the holder member and the rear portion of which overhangs the central portion of the top surface of the attaching part and has a vertically extending horizontally elongated opening therethrough, and a vertically extending screw the upper end of which extends loosely through the opening in the rear portion of the bracket and has a head and an annular flange in straddled relation with the rear portion of the bracket and the lower end of which is in the form of a screw-threaded shank which fits within a vertically extending screw-threaded hole in the upper central portion of the plate-like attaching part of the holder.

A further object of the invention is to provide a tool holder of the type and character under consideration in which the holder member is releasably locked or retained in its various adjusted positions by way of a plurality of horizontal bolts, the shanks of which extend loosely through oversized circular holes in the rear part of the holder member and project into screw-threaded holes in the plate-like attaching part.

A still further object of the invention is to provide a tool holder which is generally of new and improved construction, effectively and efficiently fulfills its intended purpose and may be adjusted with facility and produced at a comparatively low cost.

Other objects of the invention and the various advantages and characteristics of the present tool holder will be apparent from a consideration of the following detailed description.

The invention consists in the several novel features which are hereinafter set forth and are more particularly defined by claims at the conclusion hereof.

In the drawings which accompany and form a part of the present specification or disclosure and in which like numerals of reference denote corresponding parts throughout the several views:

Figure 1 is a fragmentary plan view of a turret lathe having applied to the turret thereof a tool holder embodying the invention;

Figure 2 is a top rear perspective of the holder;

Figure 3 is a top rear perspective of the holder member of the holder illustrating in detail the design and arrangement of the aligned horizontal grooves which are formed in the rear portion of the rear part of the holder member and receives slidably the shank pieces of the T-shaped keys;

Figure 4 is a front top perspective of the plate-like attaching part showing in detail the arrangement or location of the vertically extending spaced apart grooves which are formed in the front portion of the attaching part and receive slidably the cross pieces of the keys;

Figure 5 is a vertical longitudinal section of the tool holder;

Figure 6 is a vertical transverse section taken on the line 6—6 of Figure 5 and illustrating in detail the arrangement of the two horizontal coaxial screws which extend through the side portions of the inner part of the holder member and constitute the means for horizontally adjusting the holder member to a limited extent relatively to the plate-like attaching part;

Figure 7 is a vertical longitudinal section taken on the line 7—7 of Figure 6 and showing in detail the construction and arrangement of the bracket and vertically extending screw constituting the means for vertically adjusting the holder member to a limited extent relatively to the plate-like attaching part; and Figure 8 is a perspective of one of the T-shaped keys.

The tool holder which is shown in the drawings constitutes the preferred form or embodiment of the invention. It is adapted for use in connection with a turret lathe 10 and serves as a supporting medium or instrumentality for a drill, center, boring bar or other shank variety tool. The lathe 10 is shown in a fragmentary manner in Figure 1 of the drawings and embodies a conventional or standard hexagonal turret 11. The tool holder fits against one of the six side faces of the turret 11 and as its principal parts or components comprises a plate-like attaching part 12, a holder member 13, a pair of keys 14, a screw arrangement 15 for horizontally adjusting the holder member 13 to a limited extent relatively to the attaching part 12, a bracket and screw arrangement 16 for vertically adjusting the holder member to a limited extent relatively to the attaching part, and a plurality of bolts 17 for releasably locking the holder member 13 in its different adjusted positions with respect to the plate-like attaching part 12.

The attaching part 12 of the tool holder is in the form of a flat rectangular plate of steel or other suitable material and is horizontally elongated. The rear surface of the attaching part fits flatly against the adjacent side face of the turret 11. The attaching part embodies in its central lower portion a circular hole 18 and is fixedly but removably secured in place by means of a plurality of socket-head bolts 19. Such bolts are preferably four in number and are located at the corner portions of the attaching part 12. The shanks of the bolts 19 extend through cylindrical holes 20 in the corner portions of the attaching part and into screw-threaded holes or sockets 21 in the adjacent side face of the turret of the lathe. The heads of the bolts 19 are disposed in counter-bores 22 at the outer ends of the holes 20. The rear surface of the attaching part is provided with an integral inwardly extending pilot flange 23 which extends around the circular hole 18 and fits snugly within a circular hole in the adjacent side face of the turret 11. In the front portion of the attaching part 12 are two spaced apart vertically extending grooves 24. The latter are disposed substantially midway between the hole 18 and the side surfaces of the attaching part. The lower ends of the grooves 24 terminate a short distance above the counter-bores 22 in the lower corners of the attaching part and the upper ends of the grooves intersect the counter-bores in the upper corners of the attaching part.

The holder member 13 of the tool holder is located directly in front of the plate-like attaching part 12 and consists of a plate-like rear part 25 and a tubular front element 26. Preferably, the rear part 25 and the tubular front element 26 are formed integrally with one another. In order that the holder member 13 is sufficiently strong or sturdy for its intended purpose, it is preferably formed of steel or like material. The rear part 25 of the holder member fits against the front surface of, and is shaped conformably to, plate-like attaching part 12 and has in its central lower portion a circular hole 27. The latter is the same in diameter as, and registers with, the hole 18 in the central lower portion of the attaching part 12. Two aligned horizontally extending grooves 28 are formed in the rear portion of the rear part 25. Such grooves extend outwards from the side portions of the hole 27 and are of such length that their outer ends terminate inwards of the side surfaces of the rear part 25. The tubular front element 26 is connected to, and projects forwards from, the central portion of the front surface of the rear part 25 and has its inner periphery of circular cross section and in registry with the circular hole 27 in the rear part 25. It is adapted to receive and retain the drill, center, boring bar or other shank variety tool and has at the upper portion thereof two spaced apart vertically extending setscrews 29 for holding the tool in place. Such setscrews are disposed in internally threaded holes 30 which extend transversely through the upper portion of the tubular front element 26.

The keys 14 serve in connection with horizontal or vertical adjustment of the holder member 13 relatively to the attaching part 12 to guide the holder member so that it moves only truly rectilinearly horizontally and vertically. They are T-shaped and consist of cross pieces 31 and shank pieces 32. Preferably, the keys are formed of steel. As shown in Figures 4, 5, 6 and 7 of the drawings, the keys 14 are arranged so that the cross pieces 31 extend vertically and the shank pieces 32 extend horizontally and forwardly. The cross pieces 31 of the keys are mounted for vertical sliding movement in the vertically extending grooves 24 in the front portion of the attaching part 12 of the tool holder. As shown in the drawings, the grooves 24 and the cross pieces 31 are rectangular in cross section. The horizontally and forwardly extending shank pieces 32 of the keys are mounted for horizontal sliding movement in the horizontal grooves 28 in the rear portion of the rear part 25 of the holder member 12. The grooves 28 and the shank pieces 32 are, like the grooves 24 and the cross pieces 31, rectangular in cross section. When the holder member 13 is adjusted vertically as hereinafter described, the cross pieces 31 of the keys 14 slide vertically in the grooves 24, and when the holder member is horizontally adjusted the shank pieces 32 of the keys slide in the grooves 28.

The screw arrangement 15 for effecting horizontal adjustment of the holder member 13 relatively to the attaching part 12 consists of a pair of aligned horizontally extending screws 33. The latter extend through screw-threaded holes 34 in the side portions of the rear part 25 of the holder member 13 and normally have their inner ends in abutting relation with the outer side surfaces of the shank pieces 32 of the T-shaped keys 14. As best shown in Figure 6 the inner ends of the screw-threaded holes 34 intersect and communicate with the outer ends of the horizontally extending grooves 28. When it is desired to adjust the holder member 13 to the left as viewed in Figure 6, the right hand adjusting screw 34 is loosened and the left hand adjusting screw is tightened. When it is desired to adjust the holder member to the right as viewed in Figure 6, the left hand adjusting screw 34 is loosened and the right hand adjusting screw is then tightened. It is contemplated that after horizontal adjustment of the holder member 13 with respect to the attaching part 12, the adjusting screw 34 which is loosened will be tightened so as to lock the holder member in its adjusted position. The outer ends of the adjusting screws 33 are provided with kerfs (see Figure 6) in order that the screws may be turned by a screw driver or a similar turning tool.

The bracket and screw arrangement 16 for effecting vertical adjustment of the holder member 13 to a limited extent with respect to the attaching part 12 consists of a horizontally extending bracket 35 and a vertically extending screw 36. The front portion of the bracket rests on the central portion of the top surface of the rear part 25 of the holder member 13 and is removably secured in place by way of a pair of side-by-side vertically extending socket-head screws 37. The shanks of such screws extend through circular holes 38 in the front corners of the bracket 35 into screw-threaded holes 39 in the upper central portion of the rear part 25 of the holder member. The rear portion of the bracket 35 overhangs the upper central portion of the attaching part 12 and is of materially less height than the front portion of the bracket. The top surfaces of the rear and front portions of the bracket are coplanar with the result that the rear portion of the bracket is spaced above the upper central portion of the attaching part 12. A horizontally elongated opening 40 is formed in the central part of the rear portion of the bracket 35. Such opening extends in the direction of the side surfaces of the bracket and has access provided to it by way of a slot 41. The latter extends between the central portion of the rear surface of the bracket and the central portion of the opening 40. The vertically extending screw 36 of the bracket and screw arrangement 16 for effecting vertical adjustment of the holder member 13 with respect to the attaching part 12 consists of a shank 42 and a socket-equipped head 43 at the upper end of the shank. The upper end of the shank 42 has a smooth periphery and fits in and extends transversely through the opening 40 in the rear portion of the bracket 35. The central portion of the shank of the screw 36 is provided with an integral outwardly extending annular flange 44 which is spaced from the head 43 a distance corresponding to the height of the rear portion of the bracket. The head 33 and the flange 44 are arranged in straddled relation with the rear portion of the bracket and coact to prevent vertical displacement of the screw 36 with respect to the bracket 35 while at the same time permitting the screw to be turned relatively to the bracket. In connection with horizontal adjustment of the holder member with respect to the attaching part 12 the horizontally elongated opening 40 in the rear portion of the bracket 35 permits the bracket to move laterally with respect to the screw 36. In connection with assembly of the tool holder the slot 41 permits the upper end of the shank 42 of the screw 36 to be inserted into the opening 40. The lower end of the shank 42 of the vertically extending screw 36 is provided with a male or external screw thread and fits in a screw-threaded hole 45 in the upper central portion of the attaching part 12 of the tool holder. When it is desired to adjust the holder member 13 upwards with respect to the attaching part 12, the screw 36 is turned so that it feeds upwards in the screw-threaded hole 45; and when it is desired to adjust the holder member downwards the screw 36 is reversely turned so that it feeds downwards into the screw-threaded hole 45. The socket in the head 43 permits the vertically extending screws 36 of the bracket and screw arrangement 16 to be turned by a suitable wrench.

The bolts 17 for releasably locking the holder member 13 in its various adjusted positions with respect to the attaching part 12 are preferably four in number. They extend horizontally and also lengthwise of the tubular front element 26 of the holder member 13 and consist of shanks 46 and socket-equipped heads 47 at the front ends of the shanks. The shanks of the bolts 17 extend loosely through oversized holes 48 in the corner portions of the rear part 25 of the holder member and into screw-threaded holes 49 in the corner portions of the attaching part 12. When the bolts are tightened, the heads thereof serve firmly to clamp the rear part 25 against the attaching part 12. The oversized holes 48 are of such greater diameter than the shanks of the bolts 17 that when the bolts are loosened they permit the holder member 13 to be horizontally and vertically adjusted to a limited extent. When it is desired either horizontally or vertically to adjust the holder member 13 with respect to the attaching part 12, the bolts 17 are loosened. After the desired adjustment of the holder member, the bolts are tightened so as to lock the holder member in its adjusted position.

The herein described tool holder is highly efficient in operation and is characterized by the fact that the horizontal adjusting means in the form of the screws 33 and the vertical adjusting means in the form of bracket 35 and the screw 36 permit the holder member 13 to be readily adjusted so as properly to position the axis or longitudinal center of the tool with respect to the work. In view of the construction and arrangement of its parts, the tool holder may be manufactured or produced at a comparatively low cost.

The invention is not to be understood as restricted to the details set forth since these may be modified within the scope of the appended claims without departing from the spirit and scope of the invention.

Having thus described the invention what I claim as new and desire to secure by Letters Patent is:

1. A holder designed for use in connection with a turret lathe and to support a shank variety tool and comprising a plate-like attaching part adapted to fit against one of the side faces of the turret of the lathe and provided with means for fixedly securing it in place, a holder member positioned in front of the attaching part, consisting of a plate-like rear part in abutting relation with the attaching part and a tubular front element for receiving and holding the tool, and adapted to be adjusted horizontally and vertically relatively to said attaching part, one of the two aforementioned parts having in the portion thereof that faces the other part a horizontal groove and the other part having in the portion thereof that faces the one part a vertical groove in crossed relation with the horizontal groove, a key operative to guide the holder member for truly rectilinear horizontal and vertical adjustment and embodying a piece mounted for close sliding movement in the horizontal groove and a piece mounted for close sliding movement in the vertical groove, means for adjusting the holder member horizontally to a limited extent relatively to the attaching part, means including a screw for adjusting the holder member vertically to a limited extent relatively to the attaching part, and releasable means for locking the holder member in its various adjusted positions.

2. A holder designed for use in connection with a turret lathe and to support a shank variety tool and comprising a plate-like attaching part adapted to fit against one of the side faces of the turret of the lathe and provided with means for fixedly securing it in place, a holder member positioned in front of the attaching part, consisting of a plate-like rear part in abutting relation with the attaching part and a tubular front element for receiving and holding the tool, and adapted to be adjusted horizontally and vertically relatively to said attaching part, one of the two aforementioned parts having in the portion thereof that faces the other part a horizontal groove and the other part having in the portion thereof that faces the one part a vertical groove in crossed relation with the horizontal groove, a key operative to guide the holder member for truly rectilinear horizontal and vertical adjustment and embodying a piece mounted for close sliding movement in the horizontal groove and a piece mounted for close sliding movement in the vertical groove, screw type means for adjusting the holder member horizontally to a limited extent relatively to the attaching part, means including a screw for adjusting the holder member vertically to a limited extent relatively to the attaching part, and releasable means for clamping the rear part of the holder member against the attaching part after adjustment of said holder member.

3. A holder designed for use in connection with a turret lathe and to support a shank variety tool and comprising a plate-like attaching part adapted to fit against one of the side faces of the turret of the lathe and provided with means for fixedly securing it in place, a holder member positioned in front of the attaching part, consisting of a plate-like rear part in abutting relation with the attaching part and a tubular front element for receiving and holding the tool, and adapted to be adjusted horizontally and vertically relatively to said attaching part, one of the parts having in the portion thereof that faces the other part a pair of aligned horizontal grooves and the other part having in the portion thereof that faces the one part a pair of spaced apart vertical grooves in crossed relation with the horizontal grooves, a pair of keys operative to guide the holder member for truly rectilinear horizontal and vertical adjustment and embodying pieces mounted for close sliding movement in the horizontal grooves and pieces mounted for close sliding movement in the vertical grooves, means operative to adjust the holder member horizontally to a limited extent relatively to the attaching part and consisting of a pair of screws extending through horizontal screw threaded holes in the side portions of said one part, having the inner ends thereof in abutment with the pieces of the keys that are mounted for sliding movement in the horizontal grooves and adapted when one is loosened and the other tightened to adjust the holder member horizontally in one direction and when the other is loosened and the one is tightened to adjust the holder member horizontally in the opposite direction, and means for adjusting the holder member vertically to a limited extent relatively to said attaching part.

4. A holder designed for use in connection with a turret lathe and to support a shank variety tool and comprising a plate-like attaching part adapted to fit against one of the side faces of the turret of the lathe, provided with means for fixedly securing it in place, and embodying in its outer portion a pair of spaced apart vertical grooves, a holder member positioned in front of the attaching part, consisting of a plate-like rear part disposed in abutting relation with the attaching part and embodying in its rear portion a pair of aligned horizontal grooves in crossed relation with the vertical grooves and a tubular front element connected to, and projecting forwards from, the front portion of said rear part and shaped to receive and hold the tool, and adapted to be adjusted horizontally and vertically relatively to said attaching part, a pair of keys operative to guide the holder member for truly rectilinear horizontal and vertical adjustment and embodying forwardly extending pieces mounted for close sliding movement in the horizontal grooves and rearwardly extending pieces mounted for close sliding movement in the vertical grooves, means operative to adjust the holder member horizontally to a limited extent relatively to the attaching part and consisting of a pair of screws extending through screw threaded holes in the side portions of the rear part of the holder member, having the inner ends thereof normally in abutment with the outer side surfaces of the forwardly extending pieces of the keys, and adapted when one is loosened and the other tightened to adjust the holder member horizontally in one direction and when the other is loosened and the one is tightened to adjust the holder member horizontally in the other direction, means including a screw for adjusting the holder member vertically to a limited extent relatively to the attaching part, and releasable means for locking the holder member in the various adjusted positions.

5. A holder designed for use in connection with a turret lathe and to support a shank variety tool and comprising a plate-like attaching part adapted to fit against one of the side faces of the turret of the lathe and provided with means for fixedly securing it in place, a holder member positioned in front of the attaching part, consisting of a plate-like rear part in abutting relation with the attaching part and a tubular front element for receiving and holding the tool, and adapted to be adjusted horizontally and vertically relatively to said attaching part, one of the two aforementioned parts having in the portion thereof that faces the other part a horizontal groove and the other part having in the portion thereof that faces the one part a vertical groove in crossed relation with the horizontal groove, a key operative to guide the holder member for truly rectilinear horizontal and vertical adjustment and embodying a piece mounted for close sliding movement in the horizontal groove and a piece mounted for close sliding movement in the vertical groove, means for adjusting the holder member horizontally to a limited extent relatively to the attaching part, and means operative to adjust the holder member vertically to a limited extent relatively to the attaching part and consisting of a horizontal bracket having a portion thereof connected to the central portion of the top surface of said one part and another portion arranged in overhanging relation with the central top portion of the other part and provided with a horizontally elongated opening extending vertically therethrough and lengthwise of the two parts, and a vertically extending screw the upper end of which extends loosely through said opening and has a head and an annular flange in straddled relation with said other portion of the bracket and the lower end of which is screw threaded and extends into a vertically extending screw threaded hole in the top central portion of said other part.

6. A holder designed for use in connection with a turret lathe and to support a shank variety tool and comprising a plate-like attaching part adapted to fit against one of the side faces of the turret of the lathe, provided with means for fixedly securing it in place, and embodying in its front portion a pair of spaced apart vertical grooves, a holder member positioned in front of the attaching part, consisting of a plate-like rear part disposed in abutting relation with the attaching part and embodying in its rear portion a pair of aligned horizontally extending grooves in crossed relation with the vertically extending grooves and a tubular front element connected to, and projecting forwards from, the front portion of the rear part and shaped to receive and support the tool, and adapted to be adjusted horizontally and vertically relatively to said attaching part, a pair of T-shaped keys operative to guide the holder member for truly rectilinear horizontal and vertical adjustment and consisting of forwardly extending shank pieces mounted for close sliding movement in the horizontal grooves and vertically extending cross pieces mounted for close sliding movement in the vertical grooves, means operative to adjust the holder member horizontally to a limited extent relatively to the attaching part and consisting of a pair of horizontal grooves extending through screw-threaded holes in the side portions of said rear part, having the inner ends thereof normally in abutment with the outer surfaces of the shank pieces of the keys, and adapted when one is loosened and the other is tightened to adjust the holder member horizontally in one direction and when the other is loosened and the one is tightened to adjust the holder member horizontally in the opposite direction, and means operative to adjust the holder member vertically to a limited extent relatively to the attaching part and consisting of a horizontal bracket having the front portion thereof connected fixedly to the top central portion of the rear part of the holder member and its rear portion overhanging the top central portion of the attaching part and provided with a horizontally elongated opening extending vertically therethrough and lengthwise of the two parts, and a vertically extending screw the upper end of which extends loosely through said opening and has a head and annular flange in straddled relation with the rear portion of the bracket and the lower end of which is screw threaded and extends into through a vertically extending screw threaded hole in the top central portion of said attaching part.

7. A holder designed for use in connection with a turret lathe and to support a shank variety tool and comprising a plate-like attaching part adapted to fit against one of the side faces of the turret of the lathe and provided with means for fixedly securing it in place, a holder member positioned in front of the attaching part, consisting of a plate-like rear part in abutting relation with the attaching part and a tubular front element for receiving and holding the tool, and adapted to be adjusted horizontally and vertically relatively to said attaching part, one of the two aforementioned parts having in the portion thereof that faces the other part a horizontal groove and the other part having in the portion thereof that faces the one part a vertical groove in crossed relation with the horizontal groove, a key operative to guide the holder member for truly rectilinear horizontal and vertical adjustment and embodying a piece mounted for close sliding movement in the horizontal groove and a piece mounted for close sliding movement in the vertical groove, means for adjusting the holder member horizontally to a limited extent relatively to the attaching part, means for adjusting the holder member vertically relatively to the attaching part, and releasable means operative to clamp the rear part of the holder member against the attaching part after adjustment of said holder member and consisting of horizontal bolts the shanks of which extend loosely through oversized holes in one of the parts and into screw threaded holes in the other part.

References Cited in the file of this patent

UNITED STATES PATENTS

| 517,167 | Pratt | Mar. 27, 1894 |
| 767,598 | Search | Aug. 16, 1904 |
| 2,436,952 | Conkey | Mar. 2, 1948 |